United States Patent
Lanyi et al.

(10) Patent No.: US 6,485,341 B1
(45) Date of Patent: Nov. 26, 2002

(54) METHOD FOR CONTROLLING THE AVERAGE SPEED OF A VEHICLE

(75) Inventors: William D. Lanyi, Malone, WI (US); Michael J. Lemancik, Oshkosh, WI (US); John R. Boatman, Fond du Lac, WI (US); Jeffery C. Ehlers, Neenah, WI (US)

(73) Assignee: Brunswick Corporation, Lake Forest, IL (US)

( * ) Notice: Subject to any disclaimer, the term of this patent is extended or adjusted under 35 U.S.C. 154(b) by 27 days.

(21) Appl. No.: 09/827,443

(22) Filed: Apr. 6, 2001

(51) Int. Cl.$^7$ ............................................. B60K 41/00
(52) U.S. Cl. ............................................. 440/87; 440/1
(58) Field of Search .................................. 440/84, 87, 1, 440/2

(56) References Cited

U.S. PATENT DOCUMENTS

| | | | |
|---|---|---|---|
| 5,074,810 A | 12/1991 | Hobbs et al. | 440/2 |
| 5,110,310 A | 5/1992 | Hobbs | 440/1 |
| 5,113,821 A | 5/1992 | Fukui et al. | 123/335 |
| 5,362,263 A | 11/1994 | Petty | 440/1 |
| 5,364,322 A | 11/1994 | Fukui | 477/108 |
| 5,546,188 A | 8/1996 | Wangler et al. | 356/376 |
| 5,624,005 A | 4/1997 | Toril | 180/179 |
| 5,680,309 A | 10/1997 | Rauznitz et al. | 364/426 |
| 5,700,171 A | 12/1997 | Horton | 440/87 |
| 5,765,528 A | 6/1998 | Kamimaru | 123/339 |
| 5,957,992 A | 9/1999 | Kiyono | 701/93 |
| 6,109,986 A | 8/2000 | Gaynor et al. | 440/87 |

OTHER PUBLICATIONS

International Water Ski Federation 2000 Tournament Water Ski Rules, Mar. 26, 2000, Version 1.0 Edited by robert K. Corson.

*Primary Examiner*—Jesus D. Sotelo
(74) *Attorney, Agent, or Firm*—William D. Lanyi

(57) ABSTRACT

A method for controlling the average speed of a vehicle over a predetermined time period, or indefinitely, or distance length is described with reference to selecting a desired average speed, measuring an actual speed, and maintaining a cumulative error determined as a function of the difference between the average speed and actual speed and the time over which the actual speed measurement was taken. Based on the cumulative total of speed-time error, a compensatory speed is calculated that will reduce the cumulative speed-time error to an acceptable tolerance range within a selected period of elapsed time. Although particularly applicable to competition situations in which an average speed is dictated for use over a particular competition course, the average speed controlling method can be used in other situations where the average speed of a vehicle must be controlled.

20 Claims, 6 Drawing Sheets

METHOD FOR CONTROLLING THE AVERAGE SPEED OF A VEHICLE

BACKGROUND OF THE INVENTION

1. Field of the Invention

The present invention is generally related to a speed control method for a vehicle and, more particularly, to a method for maintaining an average speed of a marine vessel during a preselected period of time such as the course followed by a marine vessel during a water sport competition.

2. Description of the Prior Art

Many different types of speed control methods are known to those skilled in the art. U.S. Pat. No. 6,109,986, which issued to Gaynor et al on Aug. 29, 2000, discloses an idle speed control system for a marine propulsion system. The idle speed control system controls the amount of fuel injected into the combustion chamber of an engine cylinder as a function of the error between a selected target speed and an actual speed. The speed can either be an engine speed, measured in revolutions per minute, or it can be boat speed, measured in nautical miles per mile or kilometers per hour. By comparing target speed to actual speed, the control system selects an appropriate pulse width for the injection of fuel into the combustion chamber and regulates the speed by increasing or decreasing the pulse width.

U.S. Pat. No. 5,765,528, which issued to Kamimaru on Jun. 16, 1998, describes an idle speed control system for automotive internal combustion engines. During idling of an internal combustion engine, when there is a difference between an actual engine speed and a target idle speed which is preset in accordance with an engine load, the opening and closing timings of an intake/exhaust valve of the engine is changed in accordance with the difference between the actual engine speed and the target idle speed to change an intake air flow sucked into the engine. Therefore, it is not required to provide any apparatus, such ISC valve, provided in conventional systems, and it is possible to quickly adjust the engine speed so as to be equal to the target idle speed.

U.S. Pat. No. 5,362,263, which issued to Petty on Nov. 8, 1994, describes a trolling autopilot. The autopilot is for a vessel and for use in combination with a depth finder having a transducer, including a means for setting and storing a desired characteristic to be followed by the vessel, means for measuring the characteristic to be followed by the vessel, and means for storing a signal generated by the measuring means indicative of the measured characteristic. Once received and stored, the measured characteristic is compared to the selected characteristic. Based upon the comparison between the two characteristics, at least one servo motor is actuated to alter the direction the vessel is traveling. A servo motor may be coupled to the helm or to an outboard motor mounted to the vessel. The speed of the vessel may also be controlled based upon a comparison between a measured value and a selected value.

U.S. Pat. No. 5,364,322, which issued to Fukui on Nov. 15, 1994, describes a control apparatus for a marine engine. The apparatus is capable of effectively suppressing a great variation in the rotational speed of the engine due to a great variation in an intake air pressure particularly when the engine is trolling. In one form, an air/fuel ratio of a mixture supplied to the engine is made constant to maintain engine output power at a constant level. In another form, the intake air pressure, based on which the engine is controlled, is averaged in such a manner as to reduce a variation in the engine rotational speed by using a greater averaging coefficient during trolling than at other times. In a further form, if a variation in the intake air pressure is less than a predetermined value, the intake air pressure is used controlling the engine, whereas if otherwise, another engine operating parameter such as an opening degree of a throttle valve is used instead of the intake air pressure.

U.S. Pat. No. 5,546,188, which issued to Wangler et al on Aug. 13, 1996, describes an intelligent vehicle highway system sensor and method. An object sensor and method using pulsed laser range imaging technology is adapted for determining the velocity and three dimensional profile of a vehicle passing the sensor for classifying the type of vehicle for use in Intelligent Vehicle Highway Systems. A pair of scanned laser beams are provided by splitting a continuously pulsed laser beam from a transmitter and an optical receiver determines the presence of a vehicle in a predetermined zone such as a highway weigh station or toll booth. Range, angle and time data are collected and stored for use in determining the speed of the vehicle passing the sensor and its three dimensional profile. Forward and backward scanned beams are provided using alternate embodiments of a rotation mirror and using two transmitters/receivers in another embodiment. The pulsed energy is sent into two divergent beams, which are received as reflective energy in a receiver. The receiver accepts reflections from the beams and provides inputs for purposes of determining time of flight, and for measuring the time interval between interceptions of the two divergent beams for a given vehicle. An encoder tracks the position of the mirror for providing angle data with associated range measurements. The vehicle speed is calculated for range data collected when the vehicle passes through the forward and backward scanned beams. Three dimensional profiles are compared with preselected vehicle profiles for classifying the vehicle.

U.S. Pat. No. 5,957,992, which issued to Kiyono on Sep. 28, 1999, describes a vehicle cruise control system and method having improved target speed resolution feature. A vehicular constant-speed running system converges a vehicle speed control of a vehicle quickly to a target vehicle speed when the vehicle is set in a cruise control mode. The vehicular constant-speed running system includes a constant-speed running section for controlling a throttle opening independently of an accelerator opening to maintain a vehicle at a target vehicle speed. It is also an initial opening setting section which, at the time of transfer by the constant-speed running section, sets the throttle opening before the transfer of an initial value at the time of the transfer if the throttle opening is in a region which is preset based on either the vehicle speed at the time of the transfer or a parameter correlated with the vehicle speed. If the throttle opening is not in this region, the initial opening setting section sets the same throttle opening to the upper limit and/or the lower limit of that region.

U.S. Pat. No. 5,680,309, which issued to Rauznitz et al on Oct. 21, 1997, describes a control system for automatic resumption of speed control after gear change. The method for automatically resuming vehicle speed control after a gear change of the vehicle's manual transmission is disclosed. The method may be implemented as a subroutine in the vehicle's general control software. After disengagement of the clutch, the subroutine suspends the automatic speed control system and then periodically checks to determine if the driver has shifted gears within a predetermined time period. This determination is made by checking to see if the clutch has once again been engaged with the transmission in gear. If this occurs within the predetermined time period, then the control system automatically resumes the speed control of the engine. The determination of whether the transmission has been placed into another gear is made by an explanation of calculated gear ratios, rather than by the addition of a hardware sensor.

U.S. Pat. No. 5,624,005, which issued to Torii on Apr. 29, 1997, describes a running speed control device for a vehicle. When an "off" state of an idle switch is detected even once after an ignition switch of an internal combustion engine is turned on, a cruise ECU determines that the idle switch is normal, and performs constant-speed cruise control if the start thereof is instructed. Because the constant-speed cruise control is normally instructed while a vehicle is running, if the idle switch is normal, the idle switch becomes the "off" state at least one time during the time period until the start of the constant-speed cruise control is instructed after the ignition switch is turned on. For this reason, if the idle switch does not become the "off" state even once, the cruise ECU determines that the idle switch has failed and interrupts the constant-speed cruise control.

The patents described above are hereby expressly incorporated by reference in the description of the present invention.

Known cruise control systems typically provide a method of regulating the speed of a vehicle to a target speed without concern with the average speed of the vehicle over a preselected time or distance. For example, if a target speed of 50 miles per hour (MPH) is set for a vehicle, known cruise control algorithms react to a deviation from the target speed by regulating the vehicle speed back to the target speed. In other words, if the cruise control algorithm detects that the vehicle actually is traveling at 49 miles per hour, when the target speed is 50 miles per hour, the algorithm will take steps to increase the speed of the vehicle to 50 miles per hour. Regardless of the specific methodology employed to accomplish this task, known cruise control systems attempt to reestablish the target speed when a deviation in speed is sensed.

In certain situations, such as timed water sport competition, a requirement is set that the vehicle maintain a certain average speed over a predefined course. In these circumstances, a deviation from the targeted average speed, followed by a known type of cruise control method attempt to reestablish the target speed, will be ineffective in achieving the overall average target speed required for the competition.

It would therefore be significantly beneficial if a speed control method could be provided which assures the achievement of an average speed over a predefined distance or over a preselected time period, in which a vehicle traveling over a predefined competition course will satisfy the required time period at precisely the time when the vehicle completely traverses the length of the competition course.

SUMMARY OF THE INVENTION

A method for controlling the average speed of a vehicle performed in accordance with the present invention, comprises the steps of measuring elapsed time, defining a desired average speed, measuring an actual speed of the vehicle, and calculating an error magnitude as a function of the desired actual speed and the actual speed. The method of the present invention further comprises the steps of determining a cumulative error magnitude of the vehicle as a function of both the error magnitude and the elapsed time and then selecting a period of elapsed time over which an absolute value of the cumulative error magnitude is to be reduced to a predetermined magnitude, such as zero. The method of the present invention further comprises the step of determining a compensatory speed of the vehicle, as a function of the cumulative error and the period of elapsed time, which will reduce the cumulative error magnitude to the predetermined magnitude with in the selected period of elapsed time.

In a preferred embodiment of the present invention, the vehicle is a marine vessel and the timed measuring step, the error magnitude calculating step, the cumulative error determining step, and the compensatory speed determining step are all performed by a microprocessor. The microprocessor can be part of an engine control unit (ECU) of an engine.

A particularly preferred embodiment of the present invention further comprises the steps of sensing a starting signal and iterating the steps of the present invention repeatedly for a preselected period of time subsequent to the starting signal sensing step. The actual speed can be measured by a sonar device, a radar device, or a global positioning satellite (GPS) system. In a particularly effective embodiment of the present invention, the desired average speed, the actual speed, and the compensatory speed are all land-based speeds.

In certain embodiments of the present invention, the actual speed measuring step can comprise the steps of measuring a first distance from the vehicle to an object fixed to the land, measuring a first speed of the vehicle relative to the object, and calculating the actual speed of the vehicle as a function of the first distance and the first speed. The first period of elapsed time over which the absolute value of the cumulative error magnitude is to be reduced to a predetermined magnitude, such as zero, is selected as a function of a predetermined length of a course over which the vehicle must maintain the average speed during a competition.

BRIEF DESCRIPTION OF THE DRAWINGS

The present invention will be fully and completely understood from a reading of the description of the preferred embodiment in conjunction with the drawings, in which.

DESCRIPTION OF THE PREFERRED EMBODIMENT

Figure 1:
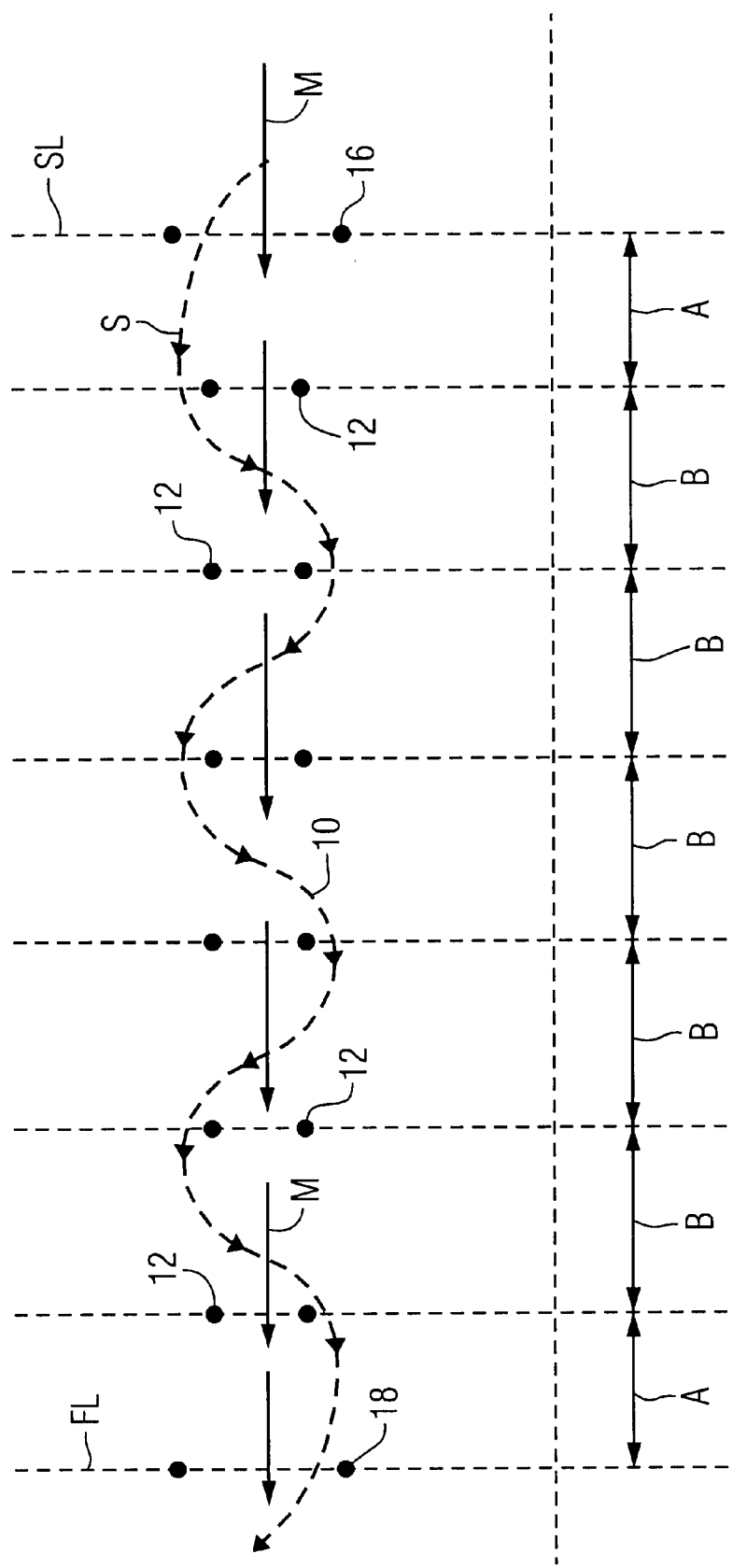
FIG. 1 shows an exemplary competition course for use in a water ski competition.

Throughout the description of the preferred embodiment of the present invention, like components will be identified by like reference numerals.

FIG. 1 shows an exemplary competition course layout that can be used for water skiing competitions. Dashed arrows 10 represent the slalom paths along which a water skier travels during the competition. Six pairs of buoys 12 define a generally straight path M along which a boat must travel as it tows a water skier traveling along path 10. In other words, the boat travels along the slalom path identified by arrows M and the towed skier travels along the path identified by dashed line arrows S. As shown in FIG. 1, the pairs of buoys 12 are separated by a prescribed distance B. In addition, a starting line SL is defined by a pair of buoys 16 and a finish line FL is defined by a pair of buoys 18. The distance between the starting line SL and the first set of buoys 12 is identified as distance A. Similarly, the distance between the final pair of buoys 12 and the finish line FL is defined as distance A. The total length of the course extends between the starting line SL and the finish line FL. As the boat travels along the generally straight line represented by arrows M, the skier traverses the course in a slalom maneuvers around the buoys 12 as represented in FIG. 1, finishing the course as the skier passes the finish line FL.

Many other types of competitions, in addition to water skiing, use various types of courses over which the competition is held. Each specific sport is governed by its own set of rules. For example, the International Water Ski Federation (IWSF) provides tournament water ski rules that define the layout of the courses, the various regulations applying to world records, and many other details regarding competition. Other sports provide different course layouts and regulations. However, one particular regulation applies to many different types of sports, including water sports. That regulation pertains to the speed at which the competitor must traverse a predetermined distance during the competition. For example, with reference to FIG. 1, one particular requirement is that the water skier traverse the course between the starting line SL and the finish line FL within a predefined time limit while successfully maneuvering in a slalom paths around the various buoys 12. In order to traverse the course between the starting line SL and the finish line FL in the prescribed time limit, within a plus or minus tolerance level, the marine vessel must travel at a precise average speed as it moves between the starting line SL and the finish line FL.

Known types of speed control systems typically require numerous trial runs of the boat in order to properly gage the speed of the boat along the defined course. In addition, known systems require that the weight of the boat, the weight of the load in the boat, and the weight of the skier be incorporated during the trial runs, with appropriated adjustments being made during the series of trial runs. In addition, known systems that regulate the speed of the boat during competition typically control the speed by controlling the engine speed (RPM). Furthermore, known systems typically attempt to achieve the desired target speed relative to the water in which a marine vessel is operated. The effects of current, wave action, and wind are not accurately compensated by known systems.

One of the problems inherent in most known speed control systems relating to marine vessels is that they regulate the speed of the vessel relative to the water in which the vessel is operated. This is done by using standard speedometers, which can incorporate a pinwheel component, or by using pilot tubes to monitor the actual speed of the boat. These devices measure the boat speed relative to the water and can therefore incorporate errors caused by the current and water flow speeds, particularly if the competition is held in a river. In order to avoid the inherent inaccuracies resulting from using conventional speedometers or pilot tubes, the present invention measures the actual speed of the boat as a land-base speed. Although this can be accomplished in several different ways, the preferred embodiment of the present invention will be described herein in terms of the use of a sonar system.

Figure 2:
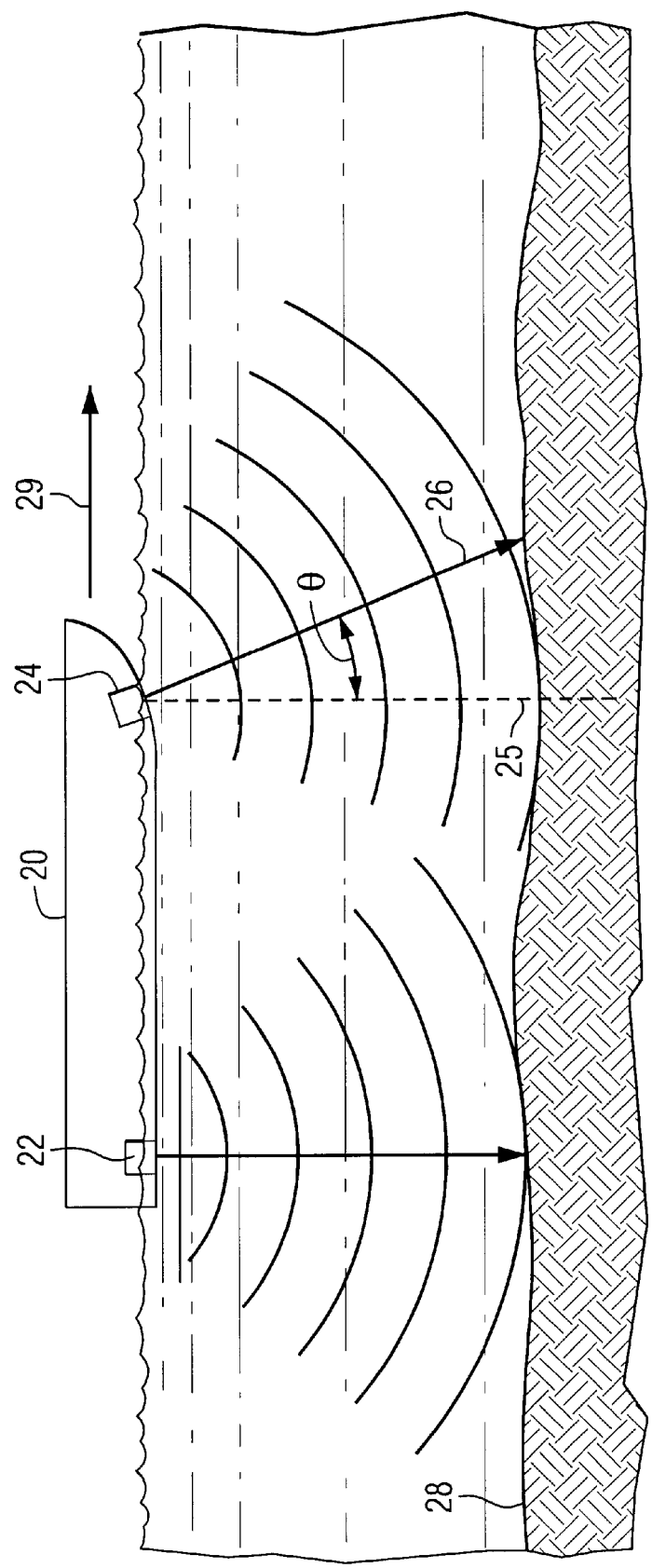
FIG. 2 shows a marine vessel equipped with two sonar transducers used to measure the depth of water and the speed of the vehicle.

FIG. 2 shows a boat 20 equipped with two sonar transducers. Although the two sensors, 22 and 24, are illustrated as being spaced apart by a considerable distance, it should be understood that minimizing both the distance between these two sensors and the magnitude of angle Θ improves the operational accuracy of a system made in accordance with the principles of the present invention. The two sensors, 22 and 24, are shown spaced apart in FIG. 2 solely for the purposes of simplicity and clarity. A first sonar transducer 22 is used solely to determine the depth of water in which the boat 20 is operated. A second sonar transducer 24 is used to measure the speed of the boat 20 with respect to an angle Θ as shown. Dashed line 25 represents a vertical line extending downward from the second transducer 24 and parallel to the line depth along which transducer 22 operates. In a generally known manner, transducer 24 transmits sound pulses at angle Θ to measure the speed of the boat 20 with respect to line 26. The depth of the water, between the transducer 22 and the bottom 28 of the body of water, is measured by sonar transducer 22. Knowing the depth of water and the speed provided by transducer 24, the speed of the boat 20 in the direction represented by arrow 29 can be determined geometrically. More specifically, the speed along line 26 divided by the sine of Θ° provides the speed in the forward direction represented by arrow 29. It should be noted that this speed is a land-based speed and is not dependent on the water current or the speed of flow of the body of water or the magnitude in direction of wind. Although FIG. 2 shows a preferred embodiment of the present invention, utilizing a pair of sonar transducers, it should also be understood that a global position satellite (GPS) system can be used. Alternatively, a radar system mounted on the boat, targeting fixed features or a relatively static backdrop on shore, can be used in the manner generally similar to that described above to determine the land-based speed of the boat.

Figure 3:
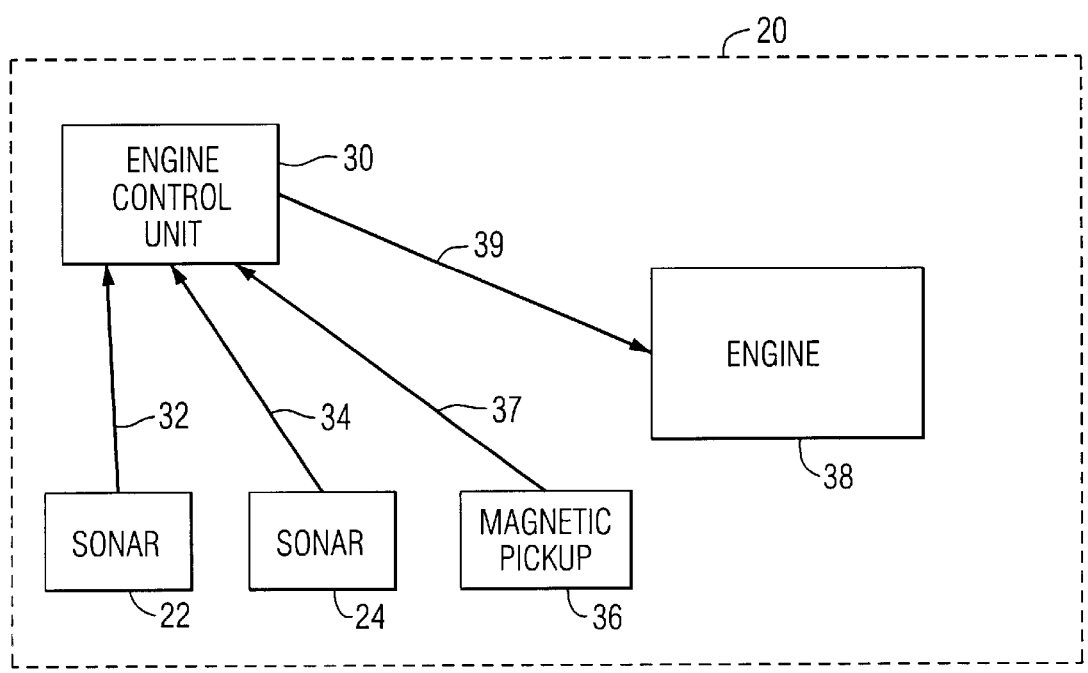
FIG. 3 is an exemplary illustration of a boat with the equipment used to perform the method of the present invention.

FIG. 3 is a schematic representation of the components used to implement the method of the present invention. A boat 20 equipped to perform the method of the present invention would comprise an engine control unit 30 which, in turn, comprises a microprocessor appropriate for executing the steps of a software program. The sonar transducers, 22 and 24, are shown providing signals, on lines 32 and 34 to the engine control unit 30. These signals would provide information relating to the depth of the water and the speed of the boat relative to the angle of the second transducer 24. In certain applications, a magnetic pickup 36 would be provided on the boat in order to sense the time when the boat passes the starting line SL. Although not necessary in all embodiments of the present invention, the magnetic pickup 36 can provide a signal on line 37 to the engine control unit 30 to identify the passing of the starting line so that various steps of the present invention can be performed with the knowledge that the boat is actually moving along the course of the competition, rather than approaching the course at the designated speed. The engine 38 is used as a propulsion means for the marine propulsion system of the boat and response to signals on line 39 from the engine control unit 30 which regulate the engine speed to achieve the desired command speed determined by the engine control unit.

It is important to understand that the purpose of the present invention is to achieve a desired average speed error of zero over a preselected distance or period of time, or both. It is not a goal of the present invention to operate as a standard cruise control system that regulates to a particular target speed, although it could be used for this purpose. This is an important distinction between the present invention and the prior art.

In speed control systems known in the prior art, a deviation from a particular target speed (e.g. 34 miles per hour) results in a correction step taken by the cruise control algorithm to return the speed of the vehicle to the target speed. In other words, if the speed control system detects that the vehicle is traveling at a non target speed (e.g. 33 miles per hour), the corrective action is to return the speed of the vehicle to 34 miles per hour. This technique will not work sufficiently accurately to result in the vehicle achieving the desired average speed over the course.

Unlike the speed control systems known in the prior art, the present invention reacts to a deviation between the target speed and the actual speed by calculating a compensatory target speed that will actually result in the achievement of an average speed over a preselected distance or time. For example, if the present invention detects that the actual speed has fallen to a slower speed (e.g. 33 miles per hour) than the target speed (e.g. 34 miles per hour), it will determine a required compensatory speed (e.g. 35 miles per hour) in order to compensate for the lost distance that occurred while the boat was traveling too slowly. In order to perform this function more accurately, the present invention actually monitors the amount of time over which the boat was traveling too slowly, or too quickly, and creates a variable that is a function of both the speed differential and the time over which the speed differential exists. This measurement, which can be typically in units of miles per hour-seconds, is then used to calculate an appropriate compensatory average speed that will result in the desired average speed over the duration of the competition. More specifically, each deviation from the target speed is responded to by a calculation that would correct the current cumulative value of the error, measured in speed and time units.

Figure 4:
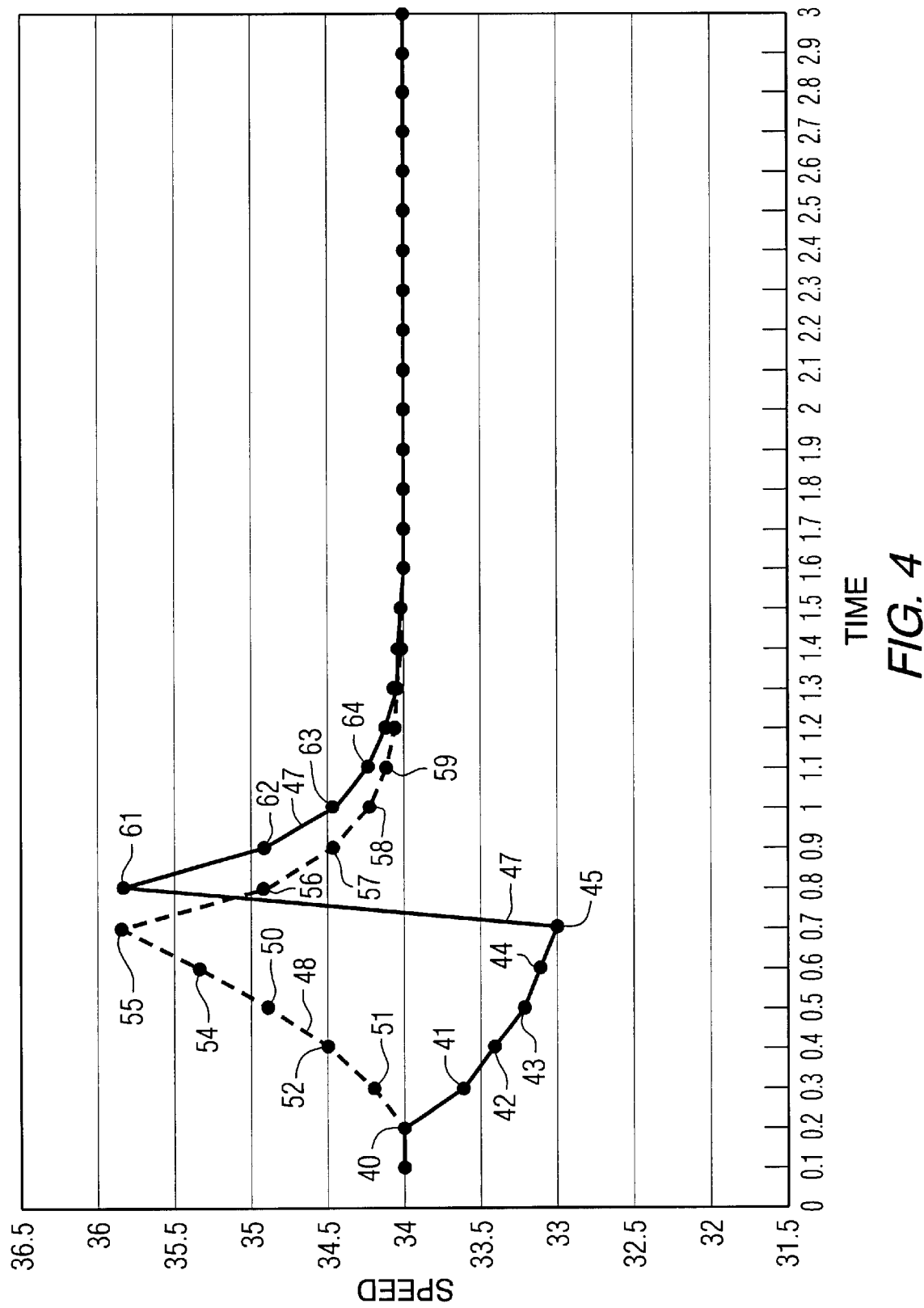
FIG. 4 is a time based theoretical graphical representation of the operation of the present invention.

FIG. 4 is an exemplary illustration of how the present invention reacts to hypothetical differences between actual measured speed and target average speed and how that reaction results in the obtaining of a desired average speed over a period of time. In FIG. 4, the horizontal axis is time, measured in tenths of a second, and the vertical axis is speed, measured in miles per hour (MPH). As can be seen, the instantaneous measured speed of the vehicle is 34.0 miles per hour up to and including the measurement taken at 0.2 seconds and identified by reference numeral 40. The next five hypothetical speed measurements, identified by reference numerals 41–45, are 33.6 miles per hour, 33.4 miles per hour, 33.2 miles per hour, 33.1 miles per hour, and 33.0 miles per hour. All of these speed readings represent hypothetical actual speeds that differ from the hypothetical desired average speed of 34.0 miles per hour. In this example, each of the actual measurements, 41–45, can be considered to exist for a tenth of a second because that is the frequency of measurement used in this example. Therefore, when actual speed measurement 41 is taken, an error of 0.4 miles per hour can be considered to have existed for 0.1 seconds. This results in an error, measured as a function of both speed and time, of 0.04 miles per hour-seconds. This specifically created parameter allows the present invention to accumulate the total speed-seconds that represent the operation of the boat at speeds other than the desired average speed of 34.0 miles per hour. When speed measurement 42 is taken, the difference between the desired speed and the actual speed is 0.6 miles per hour and it can be estimated that this speed error existed for a tenth of a second. As a result, the cumulative speed-time error count is increased by 0.06 miles per hour-seconds.

With continued reference to FIG. 4, dashed line 48 represents the calculated speed that will result in a return to an average speed of 34.0 miles per hour within a preselected time. The first calculation 51 is equal to 34.2 miles per hour. This compensatory speed is determined as a function of both the cumulative magnitude of the speed-time variable, such as miles per hour-seconds, described above and the time over which a correction to zero is desired. This compensatory speed value of 34.2 miles per hour would be used as a command speed variable provided by the engine control unit 30 to the engine 38, described above in conjunction with FIG. 3. However, in the example shown in FIG. 4, the actual speed continues to decrease from measurement 41 to measurement 42, and so on. Upon each subsequent measurement, the compensatory speed is recalculated, as represented by calculations 52, 53, 54, and 55. The decrease in actual measured speed can result from several causes. In water skiing, for example, a water skier who travels in a slalom path provides a significant force on the towing boat in a direction opposite to the movement of the boat when the water skier accelerates across the wake. When this occurs, the tendency is for the boat to slow down because of the added load in a direction opposite to its direction of travel. In water skiing competition, other factors can also cause the boat to decrease in speed. These factors can range from wind gusts to wave action.

With continued reference to FIG. 4, it can be seen that, after speed measurement 45, the speed of the boat responds quickly to the continually increased speed commands calculated at points 51–55. Eventually, the speed of the boat increases to 35.85 miles per hour as represented by point 61 in FIG. 4. It should be understood that the values represented in FIG. 4 are theoretical and provided as an explanation for the hypothetical operation of the present invention. Results could vary because of different actual conditions. However, the method of the present invention is particularly designed to react to all causes of boat speed and correct those causes expeditiously. As a result of the speed readings represented by point 61–64 in FIG. 4, the calculated compensatory speeds represented by points 56–59 continually decrease. The goal of the present invention is to assure that the total area under the curve 47 is equal to zero within a preselected time period. In other words, the area between the horizontal line at 34.0 miles per hour and curve 47 between speed measurement 40 and the crossing of horizontal line at 34.0 miles per hour between points 45 and 61 should be equal to the area between curve 47 and the horizontal line at 34.0 miles per hour from that crossing point to the point where line 47 asymptotically approaches 34.0 miles per hour and equals that magnitude. The cumulative speed-time area below the desired average speed should equal the cumulative speed-time area above the desired average speed. If this occurs, the specified distance of the course will be traversed in the specified time and the average speed of the vehicle over the course will equal the specified average speed.

With continued reference to FIG. 4, it should be understood that it is anticipated that many deviations, both in a negative and positive direction, can occur as the boat speed becomes both less than the desired average speed and greater than the desired average speed. The present invention reacts to these situations similarly, but in opposite directions. As an example, if the sudden decrease in speed represented by speed measurements 41–46 were actually a sudden increase in speed, the calculated compensatory speed magnitudes represented by point 51–59 would be less than 34.0 miles per hour. As a result, the points identified by reference numerals 61–64 would be in a downward direction in FIG. 4 and less than 34.0 miles per hour. The method of the present invention would be the same and its goal would be to reduce the cumulative speed-time errors to a predetermined magnitude, which is typically a tolerance band around 0.0 miles per hour-seconds. If this is accomplished, the speed and time goals established for the marine vessel will be achieved.

Figure 5:
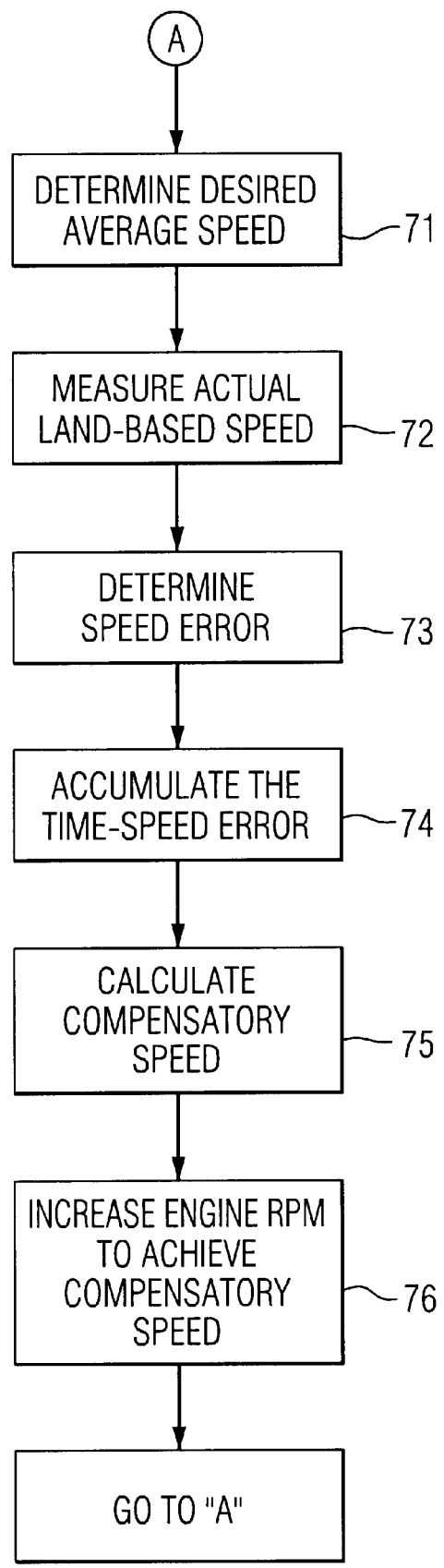
FIG. 5 is an exemplary flow chart showing the steps that can be performed by a microprocessor to implement a preferred embodiment of the present invention.

With reference to FIG. 5, a software program configured to perform the method of the present invention would first determine a desired average speed, as represented by functional block 71. This can be accomplished by asking for a manual input from the operator of the vehicle. After the operator enters the desired average speed (e.g. 34.0 miles per hour), the program represented in FIG. 5 stores that value and uses it during subsequent steps. In functional block 72, the actual land based speed is measured. This can be accomplished with a sonar arrangement such as that described above in conjunction with FIG. 2 or with any other system that is adequate to measure the speed of the vehicle. It should be understood that although the preferred embodiment of the present invention uses land-based speed as its reference, alternative embodiments could use the speed of the vehicle relative to water on which it is operated. Although this alternative embodiment is not preferred, because it can be more susceptible to error, it is feasible to use a water-based speed in circumstances where this procedure is not expected to introduce significant errors in the operation of the vehicle. For example, if the body of water on which the vehicle is operated is not expected to exhibit significant current or wave action, the water-based speed may be generally equal to the land-based speed. If water-based speed is acceptable, a boat mounted speedometer of the pin wheel type or a pilot tube can be utilized to accomplish the measuring step of functional block 72.

With continued reference to FIG. 5, functional block 73 shows that the method of the present invention determines the speed error. This is done by comparing the instantaneous actual speed to the desired average speed and then determining an error differential. This error can be plus or minus, depending on the relative speed of the boat to the desired average speed.

Functional block 74 describes that fact that the present invention then accumulates the speed-time error. It is anticipated that a preferred embodiment of the present invention repeats the procedures shown in FIG. 5 in an iterative manner at regular intervals. For example, the procedure shown in FIG. 5 can be repeated at a fixed number of cycles per second. In this case, as illustrated in FIG. 4, the procedure shown in FIG. 5 is repeated 10 times per second. As a result, each instantaneous speed value measured at functional block 72 can be assumed to represent the speed for the preceding tenth of a second. Although this assumption can lead to a finite error if the speed of the vehicle is changing rapidly, increased rates of repetition of the algorithm in FIG. 5 can reduce that error. For example, the software used to execute the steps shown in FIG. 5 can be repeated at higher speeds, such as 100 times per second or 200 times per second. Naturally, higher speeds will lead to increased accuracy in the operation of the present invention. At functional block 74, the difference between the desired average speed and the actual measured speed, determined at functional block 73, is multiplied by the time segment for which it applies. In other words, the difference measured at functional block 73 is multiplied by 0.1 seconds and the sum is added to the cumulative count maintained by the microprocessor. In functional block 74, the error multiplied by the time slice period is added to the current cumulative sum of speed-time errors. The accumulation described in functional block 74 takes into consideration the polarity of the sum. In other words, the speed-time error would be negative if the boat is going too slow and positive if the boat is going too fast. These speed-time errors therefore will tend to balance each other if they are of opposite polarities.

At functional block 75, the program calculates a compensatory speed based on the cumulative speed-time error subsequent to the step of functional block 74. In other words, the program observes the magnitude of the cumulative current algebraic sum resulting from the step of functional block 74 and then calculates a compensatory speed that will reduce that sum to an acceptable value within a preselected time period. In other words, the compensatory speed can be calculated to reduce the cumulative error to zero within three seconds. Alternatively, it can be configured to reduce the cumulative error to an acceptable tolerance band around the desired average speed within five seconds. It should be understood that the time period allowed for reduction of the cumulative time-speed error can be changed to suit the particular application in which the present invention is used.

With continued reference to FIG. 5, functional block 76 shows that the engine speed is corrected in order to achieve the compensatory speed. This can be done in several ways that are known to those skilled in the art. Basically, the net effect of functional blocks 75 and 76 is to control the speed of the engine to accomplish the compensatory speed calculated at functional block 75. Many different methods for accomplishing functional block 76 are known to those skilled in the art. More specifically, U.S. Pat. No. 6,109,986 describes a method for maintaining a particular speed of a marine vessel. The method described in U.S. Pat. No. 6,109,986 illustrates how the engine speed can be controlled by an engine control unit (ECU). Similar methods can be used to perform the step of functional block 76. After completing functional block 76, the software returns to point "A" and reiterates the steps 71–76.

With reference to FIGS. 4 and 5, it can be seen that the theoretical representation shown in FIG. 4 actually illustrates the calculated compensatory speed point (e.g. points 51–55) as occurring simultaneous with the speed measurement points (e.g. 41–45). However, it should be understood that the compensatory speed points as determined by functional block 75 actually occur slightly after the speed measurement points. In addition, the step of increasing the engine speed as described in functional block 76 occurs subsequent to the calculation of the compensatory speed. However, FIG. 4 adequately illustrates the mathematical relationship between the measured speed determined at functional block 73 and the compensatory speed calculated at functional block 75. It can also be seen that the compensatory speed values represented by dashed line 48 in FIG. 4 continue to track any deviation between the measured speed represented by line 47 and the desired average speed of 34.0 miles per hour. Even as the actual speed 47 begins to decrease at points 62–64, compensatory speeds are continually calculated and used to change the engine speed to achieve the compensatory speed, as represented by points 57–59 in FIG. 4.

With reference to FIGS. 1–5, it can be seen that the present invention measures elapsed time, such as with a clock within a microprocessor or associated with a microprocessor. The elapsed time is preferably measured in relatively short time slices, such as 0.01 seconds or less. The present invention also defines a desired average speed, such as 34.0 miles per hour, which is typically provided by a manual input from the vehicle operator. Iteratively, the present invention measures the actual speed of the vehicle, calculates an error magnitude as a function of the desired average speed and the actual speed, and determines a cumulative error magnitude of the vehicle as a function of the error magnitude and elapsed time. The measurement of the actual speed is preferably done to result in a land-speed value. Alternatively, a water-based speed can also be used in certain circumstances. The error calculated by the present invention is the difference between the desired average speed and the actual instantaneous speed that is measured. The cumulative error magnitude is a function of both the error magnitude, in miles per hour or alternative units, and the elapsed time represented by the most recent instantaneous speed measurement, such as 0.1 seconds or alternative units. Each individual error magnitude, measured in speed-time units, is added to a cumulative sum to determine the cumulative speed-time error experienced by the vehicle, such as a boat. Based on the cumulative error, a compensatory speed is calculated that will return the cumulative error magnitude to an allowable value within a selected period of elapsed time. In other words, one embodiment of the present invention may set a goal of reducing the cumulative error to zero within five seconds. Alternatively, other embodiments of the present invention can set a goal of returning the cumulative error to a value within an acceptable tolerance band around zero within three seconds. These variables can be selected to suit a particular application of the present invention and any absolute value of the variables is not limiting to the present invention. When the compensatory speed for the vehicle is determined, as a function of accumulative error and the period of elapsed, the compensatory speed is used to control an engine speed (RPM) that will result in the satisfaction of the goals set for the particular application of the present invention.

The vehicle can be a marine vessel, such as a boat, but the present invention can also be used on land or air vehicles. A microprocessor is used in a preferred embodiment of the present invention.

As described above in conjunction with FIG. 1, certain competition courses are sometimes used to define a particular distance between a starting line and a finishing line, SL and FL, and in those circumstances a preferred embodiment of the present invention would also comprise the steps of sensing a start signal so that the microprocessor of the engine control can know when the boat passes the starting line SL. Although this is not necessary in all applications, it can be helpful if the algorithm is aware of the exact time that has elapsed since the boat passed the starting line SL. Alternatively, the operator can start the present invention at some point prior to passing the starting line SL and rely on the repeated operation of the present invention to maintain the average speed for the vehicle. For example, if the period of elapsed time selected for the present invention is relatively short (e.g. two seconds), the operator of the vehicle may rely on that quick response to maintain the average speed of the boat at the desired average speed throughout the entire course from the starting line SL to the finish line FL. Alternatively, if the operator is particularly interested in maintaining the average speed only over the entire course, a longer selected period of elapsed time can be used in certain circumstances. This is optional and both choices are within the scope of the present invention.

With reference to FIGS. 1–5, it should be understood that the speed of the vehicle can be measured in miles per hour (MPH), feet per second (FPS), nautical miles per hour, or any other velocity related units. In addition, the time can be maintained in time slice intervals of any appropriate magnitude, such as 0.1 seconds, 0.01 seconds, or 0.005 seconds. These choices in the use of the present invention are not limiting to the scope of the present invention. The cumulative speed-time error therefore can be measured in miles per hour-seconds or any other speed-time units that are appropriate.

Figure 6:
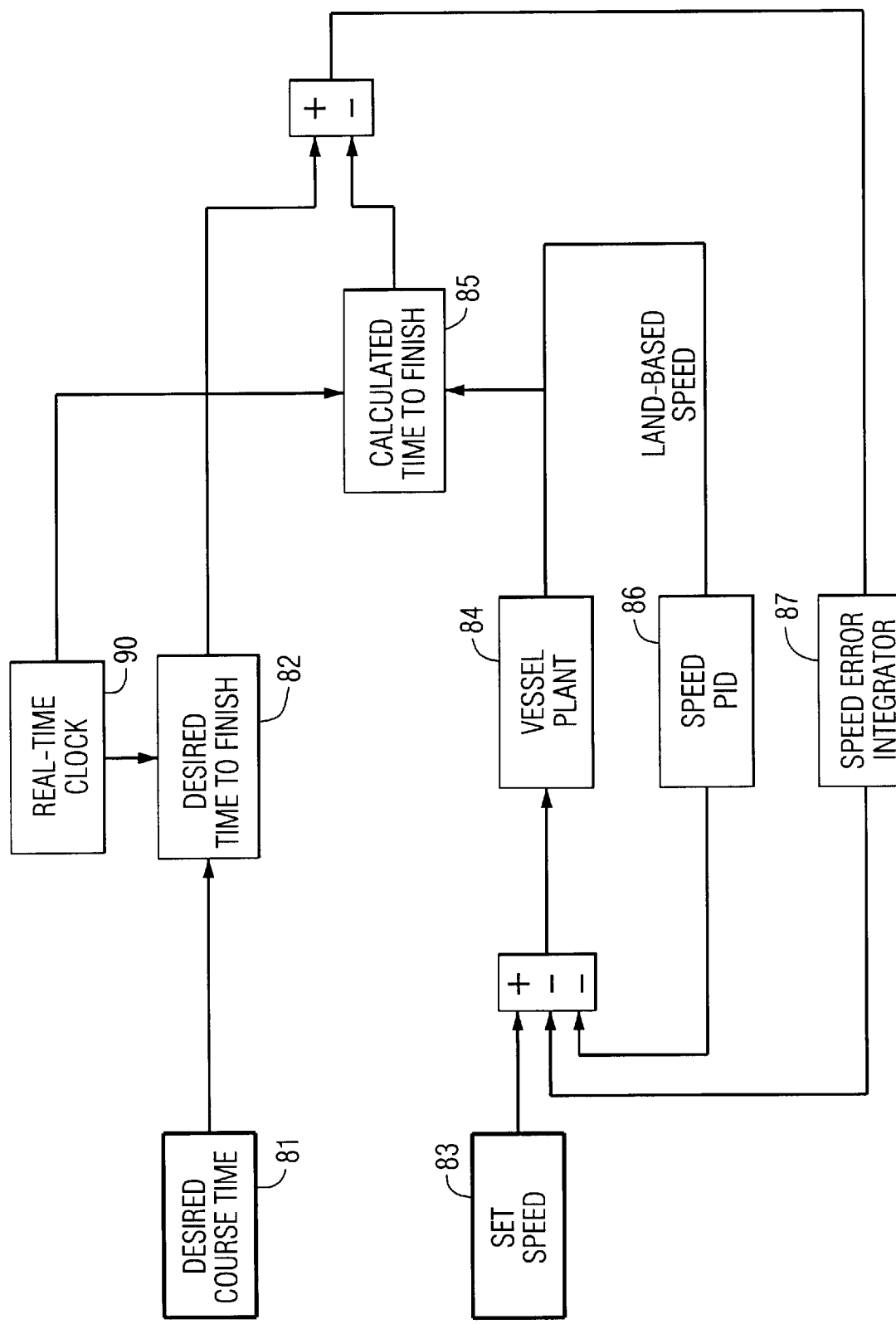
FIG. 6 is a simplified control diagram that is suitable for implementing a preferred embodiment of the present invention.

FIG. 6 illustrates a closed loop control scheme for implementing the preferred embodiment of the present invention. The diagram of FIG. 6 shows two inputs. The "Desired course time" block 81 represents the desired time, in seconds, to complete a course of a given length. This can be calculated by dividing the known length of the course by the magnitude of the "Set Speed" 83. The "Desired time to finish" the course, identified by reference numeral 82, is calculated by subtracting the elapsed time, as measured by a real time clock 90, from the "Desired course time" 81. The "Set Speed" 83 is the desired speed to be maintained, on average, throughout the course and is entered by the operator of the boat. The term "Vessel/Plant" 84 represents the set of actuators used to increase or decrease the engine speed, the engine, and the speed sensor used for feedback. The "Calculated time for finish" 85 is calculated by first subtracting the distance traveled from the length of the course and then dividing the result by the average speed. The "Speed PID" 86 is a conventional PID control loop which operates on the vessel speed. The "Speed Error Integrator" 87 is an outer control loop term that accumulates the amount of time in error with respect to speed. This term feeds back to adjust the effective set speed so that it integrates to zero. It should be understood that many alternative control methods can be used to perform the method of the present invention.

Although the present invention has been described in particular detail to illustrate the use of the present invention in a marine competition setting, it should be understood that the principles of the present invention are applicable to many other settings. Furthermore, the use of the present invention with land-based speeds is a preferable application, but alternative measurements are also within its scope.

I claim:

1. A method for controlling the average speed of a vehicle, comprising the steps of:

measuring elapsed time;

defining a desired average speed;

measuring an actual speed of said vehicle;

calculating an error magnitude as a function of said desired average speed and said actual speed;

determining a cumulative error magnitude of said vehicle as a function of said error magnitude and said elapsed time;

selecting a period of elapsed time over which an absolute value of said cumulative error magnitude is to be reduced to a predetermined magnitude; and determining a compensatory speed of said vehicle, as a function of said cumulative error and said period of elapsed time, which will reduce said cumulative error magnitude to said predetermined magnitude within said period of elapsed time.

2. The method of claim 1, wherein:

said vehicle is a marine vessel.

3. The method of claim 1, wherein:

said time measuring step, said error magnitude calculating step, said cumulative error determining step, and said compensatory speed determining step are performed by a microprocessor.

4. The method of claim 3, wherein:

said microprocessor is part of an engine control unit of an engine.

5. The method of claim 1, further comprising:

sensing a starting signal; and iterating the steps of claim 1 repeatedly for a preselected duration of time subsequent to said starting signal sensing step.

6. The method of claim 1, wherein:

said actual speed measuring step is performed by a sonar device.

7. The method of claim 1, wherein:

said actual speed measuring step is performed by a global positioning satellite system.

8. The method of claim 1, wherein:

said desired average speed, said actual speed, and said compensatory speed are all land based speeds.

9. The method of claim 1, wherein:

said actual speed measuring step comprises the steps of measuring a first distance from said vehicle to an object fixed to the land, measuring a first speed of said vehicle relative to said object, calculating said actual speed of said vehicle as a function of said first distance and said first speed.

10. The method of claim 1, wherein:

said period of elapsed time over which said absolute value of said cumulative error magnitude is to be reduced to said predetermined magnitude is selected as a function of a predetermined length of a course over which said vehicle must maintain said average speed.

11. A method for controlling the average speed of a marine vehicle, comprising the steps of:

(a) measuring elapsed time;

(b) defining a desired average speed;

(c) measuring an actual speed of said marine vehicle;

(d) calculating an error magnitude as a function of said desired average speed and said actual speed;

(e) determining a cumulative error magnitude of said marine vehicle as a function of said error magnitude and said elapsed time;

(f) selecting a period of elapsed time over which an absolute value of said cumulative error magnitude is to be reduced to a predetermined magnitude;

(g) determining a compensatory speed of said marine vehicle, as a function of said cumulative error and said period of elapsed time, which will reduce said cumulative error magnitude to said predetermined magnitude within said period of elapsed time, said time measuring step, said error magnitude calculating step, said cumulative error determining step, and said compensatory speed determining step being performed by a microprocessor;

(h) sensing a starting signal; and (i) repeating steps a–g for a preselected duration of time subsequent to said starting signal sensing step.

12. The method of claim 11, wherein:

said microprocessor is part of an engine control unit of an engine.

13. The method of claim 12, wherein:

said actual speed measuring step is performed by a sonar device.

14. The method of claim 12, wherein:

said actual speed measuring step is performed by a global positioning satellite system.

15. The method of claim 12, wherein:

said desired average speed, said actual speed, and said compensatory speed are all land based speeds.

16. The method of claim 15, wherein:

said actual speed measuring step comprises the steps of measuring a first distance from said marine vehicle to an object fixed to the land, measuring a first speed of said marine vehicle relative to said object, calculating said actual speed of said marine vehicle as a function of said first distance and said first speed.

17. The method of claim 15 wherein:

said period of elapsed time over which said absolute value of said cumulative error magnitude is to be reduced to said predetermined magnitude is selected as a function of a predetermined length of a course over which said marine vehicle must maintain said average speed.

18. A method for controlling the average speed of a vehicle, comprising the steps of:

(a) measuring elapsed time;

(b) defining a desired average speed;

(c) measuring an actual speed of said vehicle;

(d) selecting a period of elapsed time over which a cumulative average speed of said vehicle will equal said desired average speed within a preselected tolerance band; and (e) determining a compensatory speed of said vehicle, which will result in said vehicle achieving said desired average speed within said period of elapsed time and within said preselected tolerance band.

19. The method of claim 16, further comprising:

(f) sensing a starting signal; and (g) repeating steps a–e for a preselected duration of time.

20. The method of claim 16, further comprising:

(f) calculating an error magnitude as a function of said desired average speed and said actual speed;

(g) determining a cumulative error magnitude of said vehicle as a function of said error magnitude and said elapsed time;

(f) selecting a period of elapsed time over which an absolute value of said cumulative error magnitude is to be reduced to a predetermined magnitude;

(g) determining said compensatory speed of said vehicle, as a function of said cumulative error and said period of elapsed time, which will reduce said cumulative error magnitude to said predetermined magnitude within said period of elapsed time, said time measuring step, said error magnitude calculating step, said cumulative error determining step, and said compensatory speed determining step being performed by a microprocessor.

* * * * *